(12) United States Patent
Yoo et al.

(10) Patent No.: US 11,584,028 B2
(45) Date of Patent: Feb. 21, 2023

(54) CABLE GUIDE DEVICE OF ARTICULATED ROBOT

(71) Applicant: Samsung Electronics Co., Ltd., Suwon-si (KR)

(72) Inventors: Heejong Yoo, Suwon-si (KR); Kyungshik Roh, Suwon-si (KR); Cheolhee Kim, Suwon-si (KR); Soosang Yang, Suwon-si (KR); Sangjun Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/266,570

(22) PCT Filed: Jun. 27, 2019

(86) PCT No.: PCT/KR2019/007782
§ 371 (c)(1),
(2) Date: Feb. 5, 2021

(87) PCT Pub. No.: WO2020/032390
PCT Pub. Date: Feb. 13, 2020

(65) Prior Publication Data
US 2021/0308878 A1   Oct. 7, 2021

(30) Foreign Application Priority Data
Aug. 6, 2018 (KR) .................. 10-2018-0091210

(51) Int. Cl.
*B25J 19/00* (2006.01)
*H02G 3/04* (2006.01)

(52) U.S. Cl.
CPC ........ *B25J 19/0025* (2013.01); *H02G 3/0456* (2013.01)

(58) Field of Classification Search
CPC . B25J 19/0025; B25J 19/0029; B25J 19/0041
See application file for complete search history.

(56) References Cited

U.S. PATENT DOCUMENTS 4,468,070 A * 8/1984 Yasuoka ................ H01R 35/00
439/13
5,694,813 A * 12/1997 McLaughlan ........ B25J 19/0029
248/52

(Continued)

FOREIGN PATENT DOCUMENTS

| JP | S60-197390 A | 10/1985 |
| JP | H05-245789 A | 9/1993 |

(Continued)

OTHER PUBLICATIONS

Supplementary European Search Report dated Sep. 7, 2021 in connection with European Patent Application No. 19 84 6193, 8 pages.

(Continued)

*Primary Examiner* — William C Joyce
*Assistant Examiner* — Gregory T Prather

(57) ABSTRACT

A cable guide device of an articulated robot is disclosed. The disclosed cable guide device can comprise: a base; at least one rotary arm rotatably coupled to the base in an articulated form; at least one cable passing through the base so as to be connected to the rotary arms; a cable guide block coupled to a driving unit within the base; a sliding groove formed on the outer peripheral surface of the cable guide block; and a cable friction reducing device member which is coupled to a portion of the cable accommodated in the base and which rotates along the sliding groove together with the portion of the cable according to the rotation of the rotary arms.

15 Claims, 14 Drawing Sheets

(56) References Cited

U.S. PATENT DOCUMENTS

| | | |
|---|---|---|
| 6,431,018 B1 | 8/2002 | Okada et al. |
| 6,644,602 B1 | 11/2003 | Lundstrom et al. |
| 9,138,902 B2 | 9/2015 | Suzuki et al. |
| 9,802,327 B2 | 10/2017 | Kirihara et al. |
| 2011/0154933 A1* | 6/2011 | Liu ................. B25J 19/0029 74/490.02 |
| 2014/0290416 A1 | 10/2014 | Demura et al. |
| 2015/0068350 A1* | 3/2015 | Kirihara ............. B25J 17/02 901/28 |
| 2017/0210016 A1* | 7/2017 | Nakano ........... B25J 19/0029 |
| 2018/0001487 A1* | 1/2018 | Miyasaka ............ B25J 9/126 |
| 2020/0038985 A1* | 2/2020 | Inoue ............... B25J 11/005 |
| 2021/0170608 A1* | 6/2021 | Ando ................. H02G 11/00 |
| 2022/0088772 A1* | 3/2022 | Dellon ............. B25J 19/0025 |

FOREIGN PATENT DOCUMENTS

| | | |
|---|---|---|
| JP | H07-124886 A | 5/1995 |
| JP | 2559807 B2 | 12/1996 |
| JP | 2003-225883 A | 8/2003 |
| JP | 5891018 B2 | 2/2016 |
| JP | 2017-064807 A | 4/2017 |
| KR | 10-0239148 B1 | 4/2000 |
| KR | 2012-0029333 A | 3/2012 |
| KR | 10-1305975 B1 | 9/2013 |
| KR | 10-1595922 B1 | 2/2016 |
| KR | 10-2018-0001959 A | 1/2018 |
| WO | 00/25990 A1 | 5/2000 |
| WO | 2016/035165 A1 | 3/2016 |

OTHER PUBLICATIONS

International Search Report dated Oct. 14, 2019 in connection with International Patent Application No. PCT/KR2019/007782, 2 pages.
Written Opinion of the International Searching Authority dated Oct. 14, 2019 in connection with International Patent Application No. PCT/KR2019/007782, 2 pages.
Korean Intellectual Property Office, "Notice of Preliminary Rejection," dated Sep. 21, 2022, in connection with Korean Patent Application No. KR10-2018-0091210, 13 pages.

* cited by examiner

CABLE GUIDE DEVICE OF ARTICULATED ROBOT

CROSS-REFERENCE TO RELATED APPLICATIONS

This application is a 371 of International Application No. PCT/KR2019/007782 filed on Jun. 27, 2019, which claims priority to Korean Patent Application No. 10-2018-0091210 filed on Aug. 6, 2018, the disclosures of which are herein incorporated by reference in their entirety.

BACKGROUND

1. Field

Various embodiments of the disclosure relate to a guide device that protects cables disposed in a base, in a cable-embedded multi-articulator joint robot.

2. Description of Related Art

Various types of industrial 6-axis multi-articulator joint robots have been developed for automated/unmanned factories and have rapidly been installed at various manufacturing sites.

Industrial 6-axis multi-articulator joint robots may be classified, according to the wiring type, into externally wired robots having various cables exposed to the outside, and internally wired robots having cables embedded in the robot body.

However, externally wired robots have a problem in that the degree of utilization regarding the operation space is degraded because externally installed cables increase the operation radius, thereby requiring a larger operation space to be secured.

In addition, in the case of an internally wired robot, the operation space may be be easily secured, but the cables integrated in the narrow body of the robot cause friction with the body during a robot joint operation. Therefore, internally wired robots, without a structure/mechanical device for alleviating friction, may be at a substantial disadvantage against externally wired robots, in terms of the cable lifespan.

Various embodiments of the disclosure may provide a cable guide device having a movable friction reducing mechanism installed in a one-axis base, through which the largest number of cables extend, in connection with an internally wired multi-articulator joint robot, thereby reducing the risk of cable disconnection and maximizing the lifespan of robot cables.

Various embodiments of the disclosure may provide a cable guide device employing a normal cable protective pipe instead of a high-rigidity protecting pipe, thereby reducing the cost and decreasing the base size.

SUMMARY

A cable guide device according to various embodiments of the disclosure may include: a base; one or more rotary arms rotatably coupled to the base in an articulated form; one or more cables connected to the rotary arm via the base; a cable guide block coupled to a driver in the base; a sliding groove disposed on an outer peripheral surface of the cable guide block; and a cable friction reducing mechanism coupled to portions of the cables accommodated in the base, and configured to rotate in the sliding groove together with the portions of the cables as the rotary arms rotate.

The disclosure can reduce the risk of cable disconnection in connection with a cable-embedded multi-articulator joint robot.

In addition, the disclosure employs a cable friction reducing mechanism in connection with a cable-embedded multi-articulator joint robot such that an inexpensive cable protecting pipe can be used, thereby reducing the cost.

DETAILED DESCRIPTION

Figure 1:
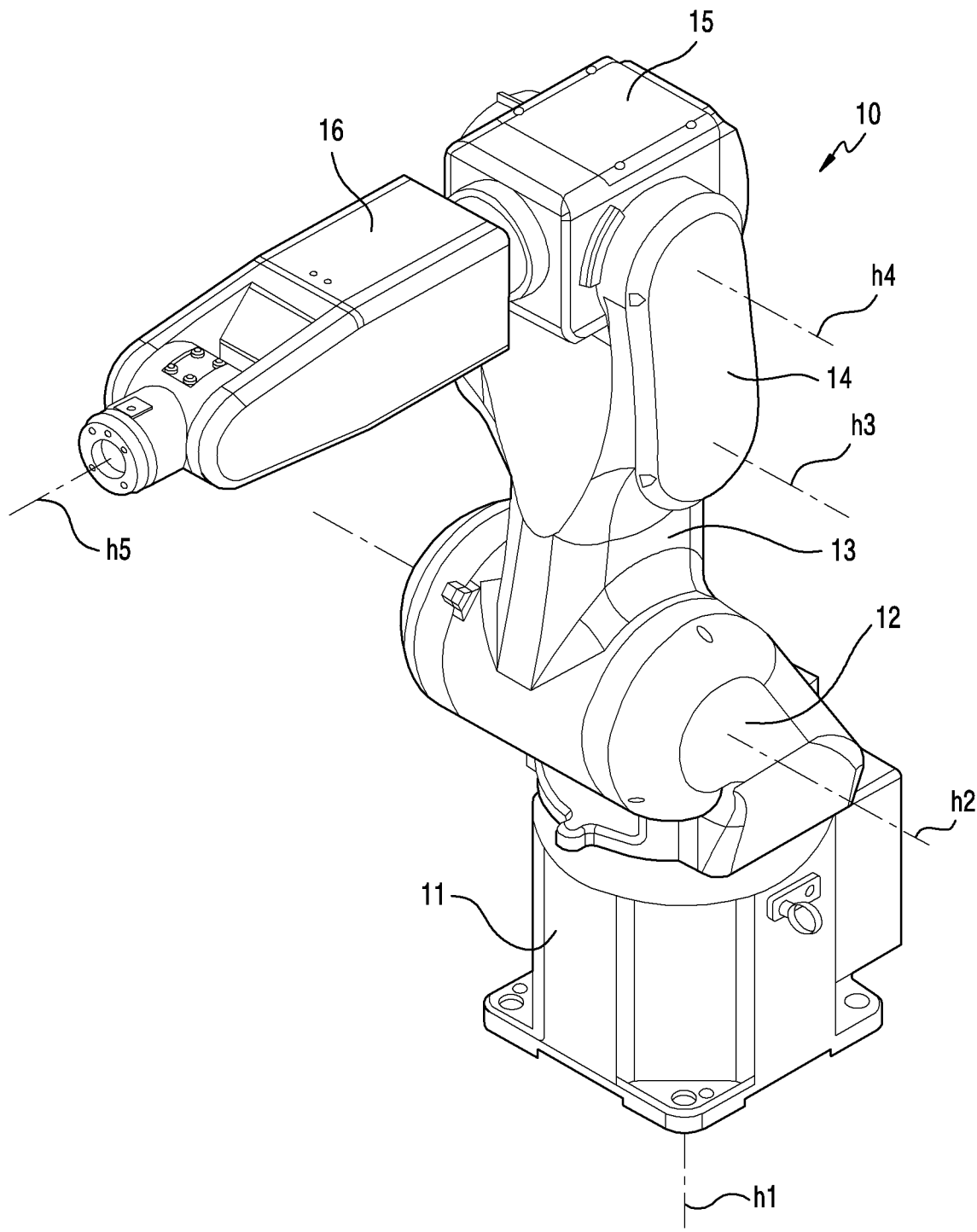
FIG. 1 is a perspective view illustrating a multi-articulator joint robot according to various embodiments of the disclosure.

Hereinafter, various embodiments of the disclosure will be described with reference to the accompanying drawings. Accordingly, those of ordinary skill in the art will recognize that modifications, equivalents, and/or alternative on the various embodiments described herein can be variously made without departing from the scope and spirit of the disclosure. With regard to the description of drawings, similar components may be marked by similar reference numerals.

FIG. 1 is a perspective view illustrating a multi-articulator joint robot according to various embodiments of the disclosure.

Referring to FIG. 1, a multi-articulator joint robot 10 according to various embodiments is a 6-axis multi-articulator joint robot, and a plurality of multi-articulator joint robots 10 may be installed for factory automation or unmanned processes of various manufacturing fields. The multi-articulator joint robots may be classified into externally wired robots, in which various cables are exposed to the outside, and internally wired robots, in which cables are embedded in a robot body according to cable wiring manners, and the multi-articulator joint robot 10 according to various embodiments may be an internal wiring robot. A power supply of the multi-articulator joint robot 10 may be electrically connected to a driver (not illustrated) of a plurality of rotary arms 12 to 14 and an operation device 16 through wired cables. The mentioned cables (e.g., a cable 30 of FIG. 3A) may be a cable provided in a cable protecting pipe.

The multi-articulator joint robot 10 according to various embodiments may include a base 11, and one or more rotary arms 12 to 15 rotatably connected to the base 11. The operation device 16 may be coupled to the last rotary arm 15, among the rotary arms 12 to 15 to perform a desired operation. For example, the multi-articulator joint robot 10 may include a multi-articulator joint robot having four axes or six axes or more according to the number of the rotary arms.

The rotary arm according to various embodiments may include a first rotary arm 12 that rotates about a first hinge axis h1 with respect to the base 11, a second rotary arm 13 that rotates about a second hinge axis h2 with respect to the first rotary arm 12, a third rotary arm 14 that rotates about a third hinge axis h3 with respect to the second rotary arm 13, a fourth rotary arm 15 that rotates about a fourth hinge axis h4 with respect to the third rotary arm 14, and an operation device 16 that rotates about a fifth hinge axis h5 with respect to the fourth rotary arm 15. A driving motor, which is not illustrated, is mounted on the base 11 and the driving motor is connected to the first rotary arm 12 by a reduction gear 113 such that the base 11 rotates at a predetermined angle or less. For example, the first rotary arm 12 may rotate at (−)175 degrees to (+)175 degrees with respect to the base 11.

Figure 2:
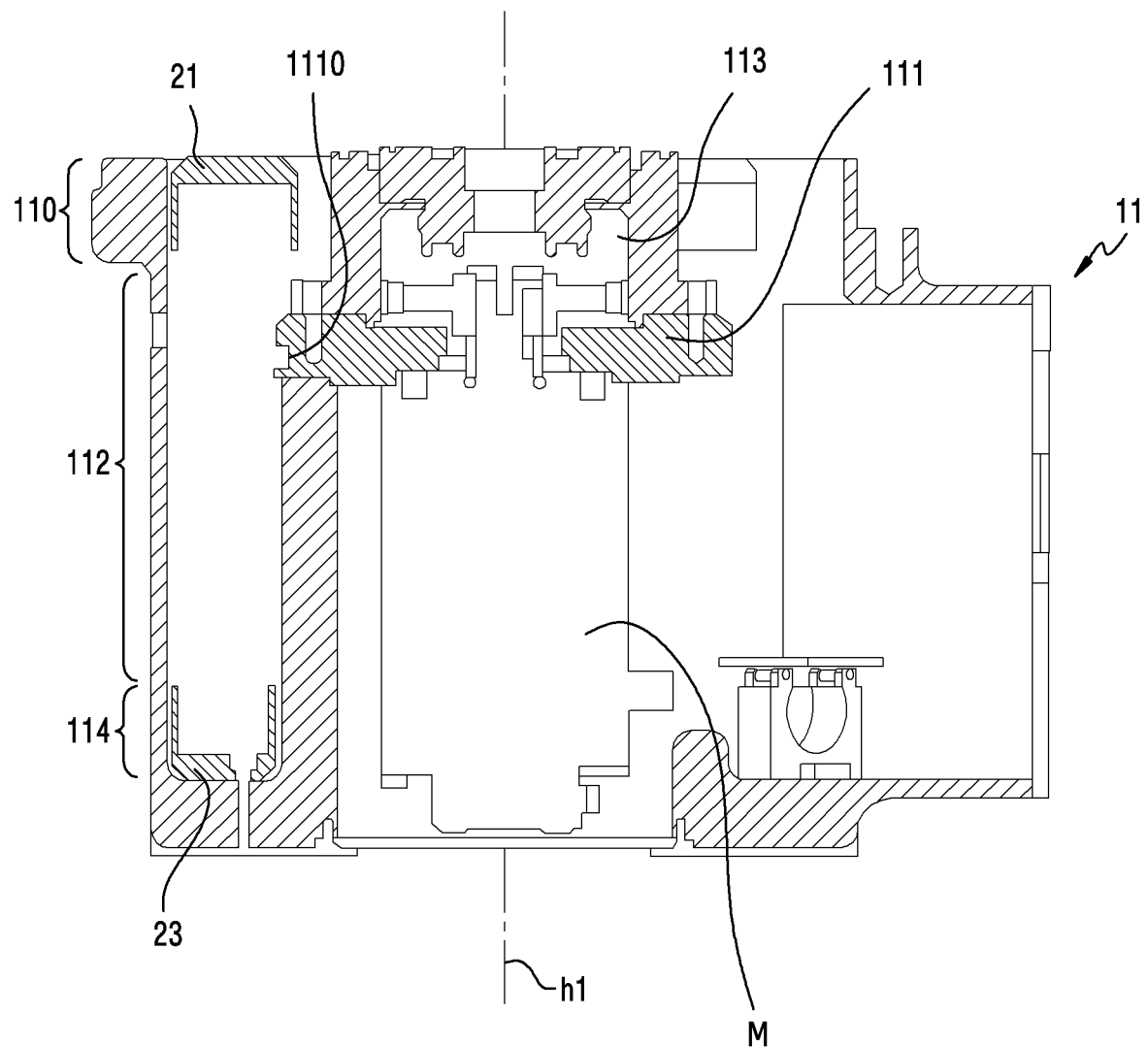
FIG. 2 is a cross-sectional view illustrating an internal configuration of a base according to various embodiments of the disclosure.

FIG. 2 is a cross-sectional view illustrating an internal configuration of a base according to various embodiments of the disclosure.

Referring to FIG. 2, in the multi-articulator joint robot (e.g., the multi-articulator joint robot 10 of FIG. 1) according to various embodiments, the cable (e.g., the cable 30 of FIG. 3A) extracted from an external connector, which is not illustrated, should be extracted toward the first rotary arm (e.g., the first rotary arm 12 of FIG. 1) after being inserted into the base 11. The base 11 is a fixed body and the first rotary arm is a rotary body whereby one or more cable protecting mechanisms for protecting the cable (e.g., the cable 30 illustrated in FIG. 3A) accommodated in the base 11 may be installed in the multi-articulator joint robot.

The base 11 according to various embodiments may be classified into three areas. For example, the base 11 may include an upper end area 110, a lower end area 114, and a middle area 112 between the upper end area 110 and the lower end area 114. The lower end area 114 of the base 11 may be a fixed part, the upper end area of the base 11 may be a part, to which the first rotary arm (e.g., the first rotary arm 12 of FIG. 1) is coupled and which rotates, and the middle area 112 of the base 11 may be an area, to which a tension of the cable is applied as the upper end area 110 rotates.

One or more mechanisms that may protect the cable 30 disposed in the three areas 110, 112, and 114 may be installed in the multi-articulator joint robot 10 according to various embodiments. For example, the mechanism may be a protection device for protecting the cable 30 from rotation of the first rotary arm 12.

A driving motor M, a reduction gear 113, a cable (e.g., the cable 30 of FIG. 3A), a movable cable guide 22 (the movable cable guide 22 of FIG. 3A), a cable guide block 111, and one or more cable protecting members 21 and 23 may be accommodated in the base 11 according to various embodiments. The base 11 may include the driving motor M, the cable guide block 111, and the reduction gear 113 along the first hinge axis h1.

The driving motor M, the cable guide block 111, and the reduction gear 113 may be disposed on the same axis, and may be disposed to be stacked.

The first cable protecting member 21 may be disposed in the upper end area 110 of the base 11 according to various embodiments, the second cable protecting member 23 may be disposed in the lower end area 114, and the movable cable guide 22 may be disposed between an inner wall of the base 11 and the guide block 111 in the middle area 112. The reduction gear 113 may be engaged with the guide block 111 by a plurality of engaging members. Reference numeral 1110 may denote a sliding groove disposed at at least a portion of an outer peripheral surface of the cable guide block 111.

According to various embodiments, the reduction gear 113 may be coupled to an upper end of the cable guide block (e.g., the cable guide block 111 of FIG. 2), and a lower end of the cable guide block may be coupled to the base 11. According to the coupling structure of the cable guide block 111, the cable guide block 11 may function as an adapter. For example, a portion of the base 11, to which the cable guide block 111 is coupled, may be a driving motor M.

Figure 3A:
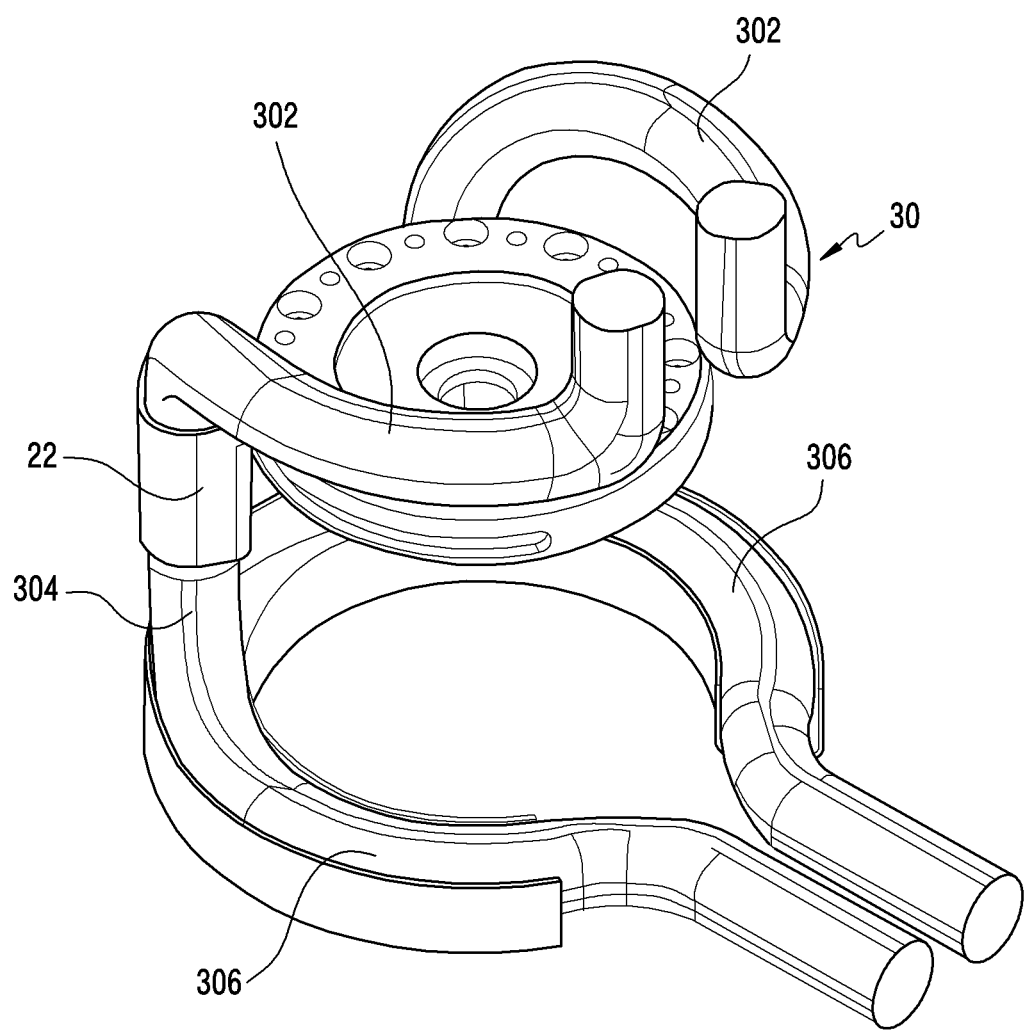
FIG. 3A is a perspective view illustrating a state of a cable disposed in a base according to various embodiments of the disclosure.
Figure 3B:
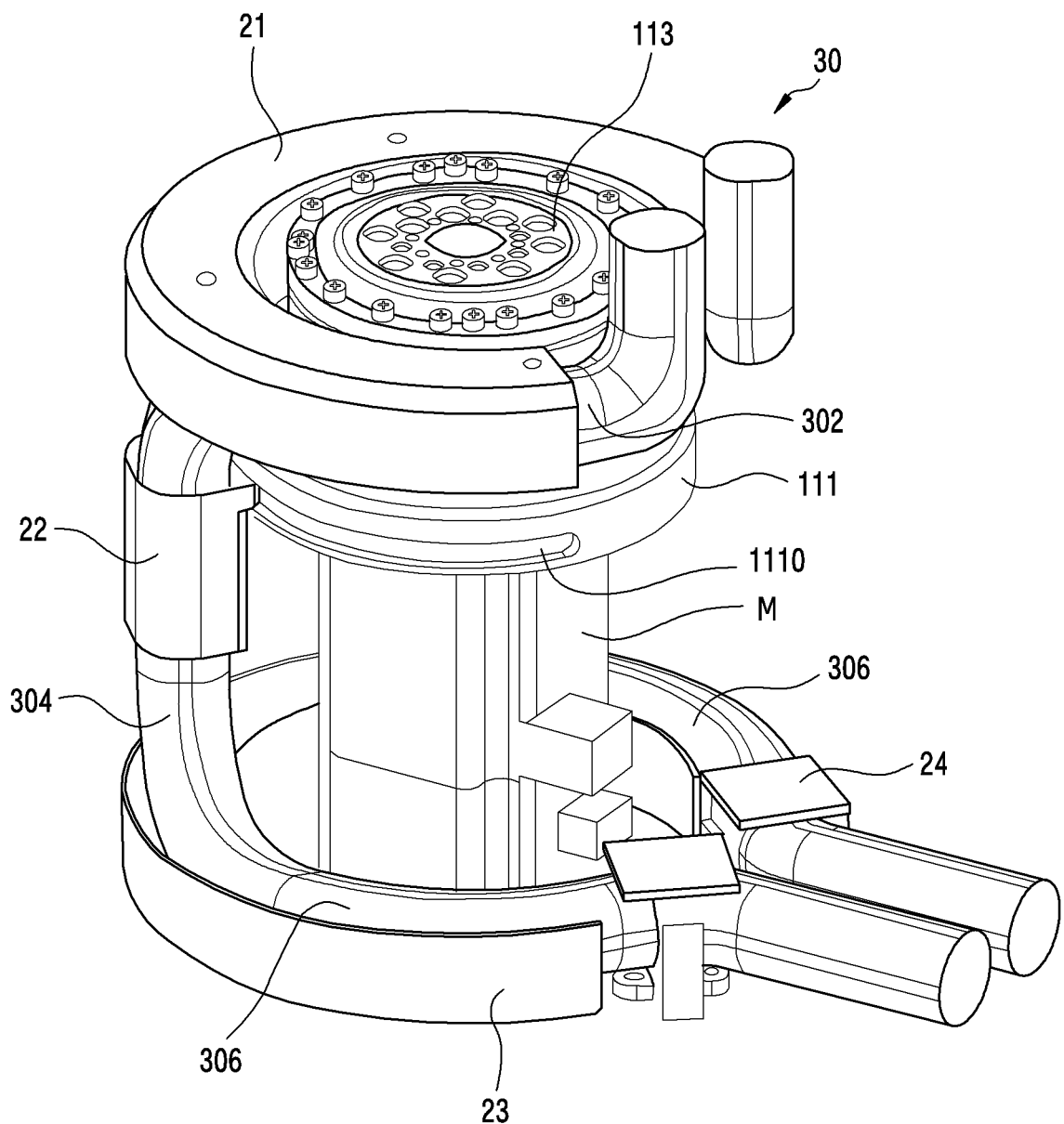
FIGS. 3B and 3C are perspective views illustrating states in which a cable is protected by a friction reducing mechanism according to various embodiments of the disclosure, and a base is omitted.
Figure 3C:
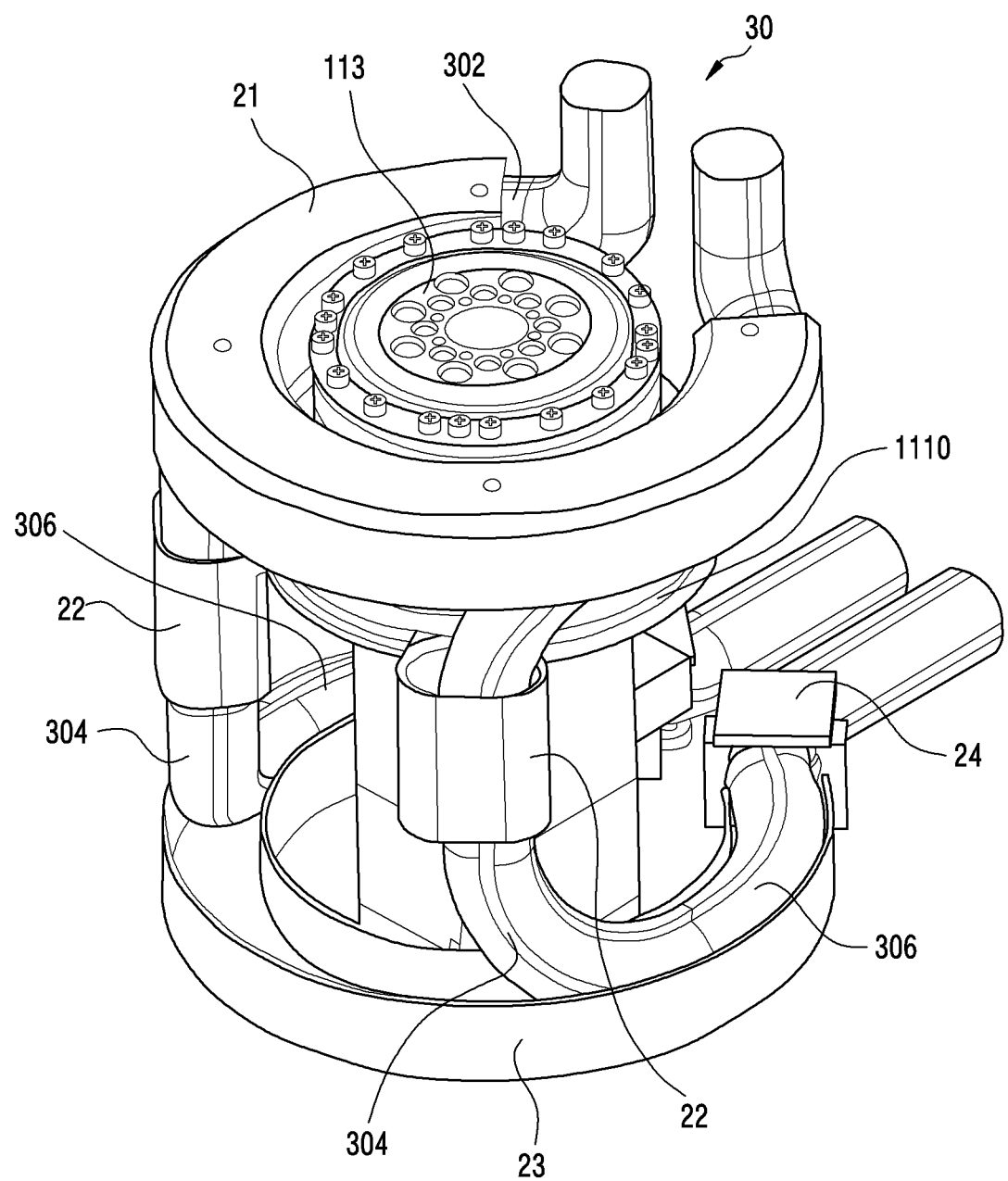
Figure 3D:
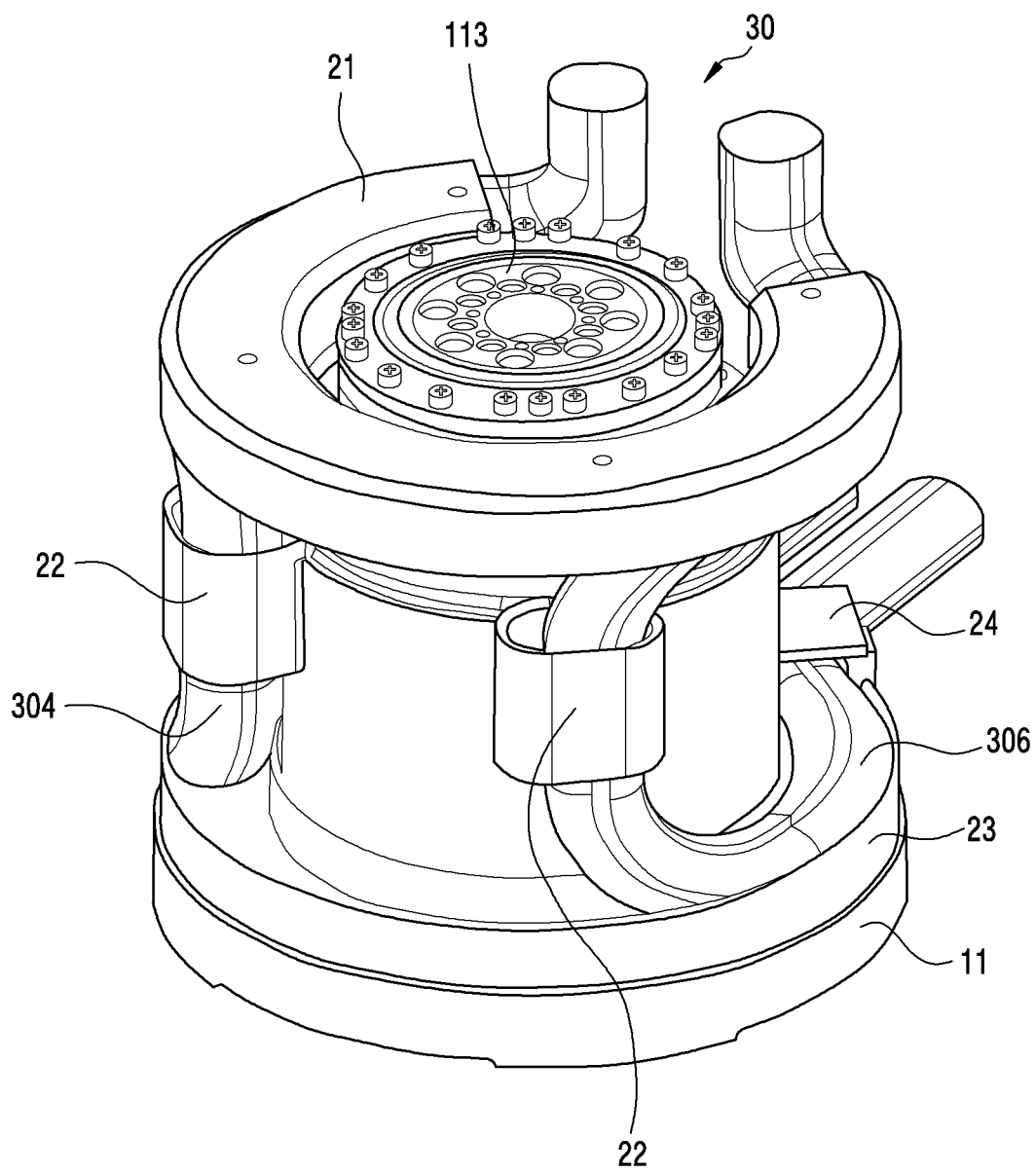
FIGS. 3D and 3E are perspective views illustrating states in which a cable is protected by a friction reducing mechanism according to various embodiments of the disclosure, and an inner wall of a base is omitted.
Figure 3E:
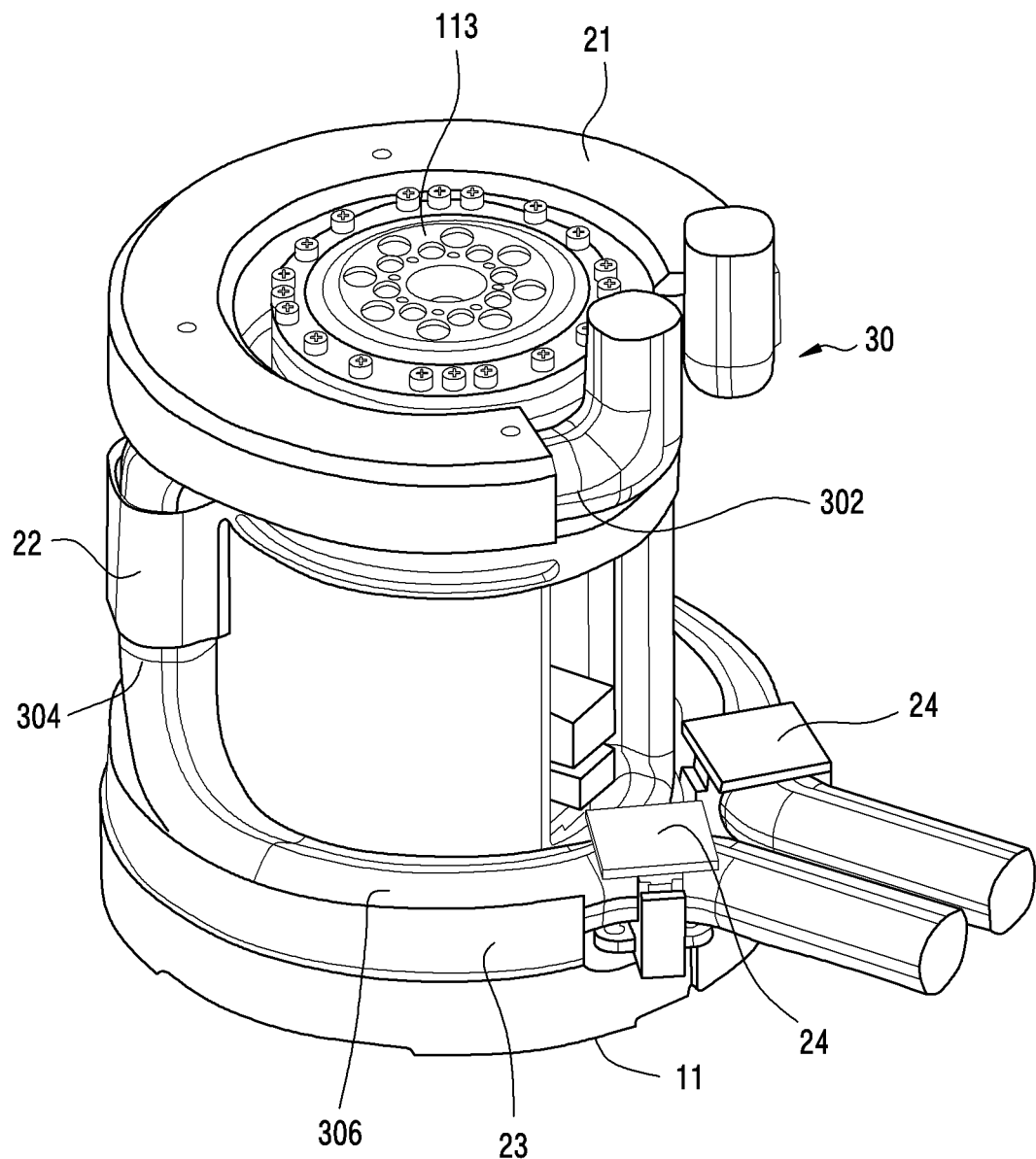
Figure 3F:
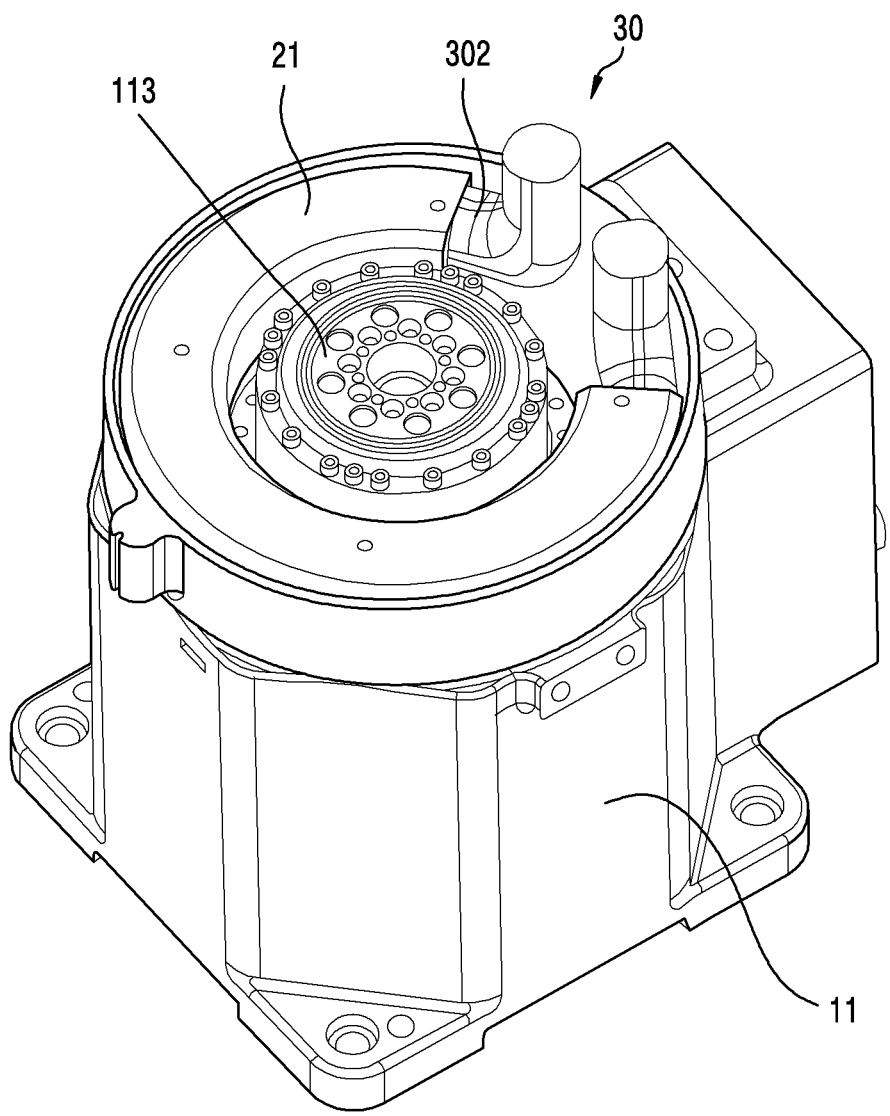
FIG. 3F is a perspective view illustrating a base in a state in which a cable protected by a friction reducing mechanism is accommodated, according to various embodiments of the disclosure.

FIG. 3A is a perspective view illustrating a state of a cable disposed in a base according to various embodiments of the disclosure. FIGS. 3B and 3C are perspective views illustrating states in which a cable is protected by a friction reducing mechanism according to various embodiments of the disclosure, and a base is omitted. FIGS. 3D and 3E are perspective views illustrating states in which a cable is protected by a friction reducing mechanism according to various embodiments of the disclosure, and an inner wall of a base is omitted. FIG. 3F is a perspective view illustrating a base in a state in which a cable protected by a friction reducing mechanism is accommodated, according to various embodiments of the disclosure.

Referring to FIGS. 3A to 3F, the cable 30 according to various embodiments is an electrical connection device and may be covered by a cable protecting pipe. A pair of cables 30 may be extracted toward the first rotary arm 12 after being disposed in the base 11 to be substantially symmetrical to each other, and may be extracted toward the first arm 12 in a state in which the cables 30 are accommodated in a space between the base 11 and the driving motor M.

The cable 30 according to various embodiments may include first to third portions 302 to 306 accommodated in the base 11. For example, when the interior space of the base 11 is classified into an upper end area (e.g., the upper end area 110 of FIG. 2), a lower end area (e.g., the lower end area 114 of FIG. 2), and a middle area (e.g., the middle area 112 of FIG. 2) between the upper end area and the lower end area, the first portion 302 may be accommodated in the upper end area 110, the third portion 306 may be accommodated in the lower end area 114, and the second portion 304 may be accommodated in the middle area.

For example, the first portion 302 of the cable is curved, and an end of the first portion 302 may face the first rotary arm to be extracted into the first rotary arm. The second portion 304 is linear, and may be disposed in the interior space of the base in a vertical state. The third portion 306 is curved, and an end of the third portion 306 may face an external connector, which is not illustrated, to be extracted to the outside of the base 11. A bending portion may be disposed between the first portion 302 and the second portion 304, and a bending portion may be disposed between the second portion 304 and the third portion 306.

The third portion 306 of the cable 30 according to various embodiments may be disposed horizontally in the lower end area 114 of the base 11. An end of the third portion 306 may be bent to be connected to the second portion 304 that linearly faces a vertically upward direction. An end of the second portion 304 may be bent to be connected to the first portion 302 horizontally in a curved form.

The first cable protecting member 21 may rotate as the first rotary arm (e.g., the first rotary arm 12 of FIG. 1) according to various embodiments rotates, the first portion 302 of the cable may rotate as the first cable protecting member 21 rotates, and the second portion 304, that is, the movable cable guide 22 in a state in which the second portion 304 passes through the movement cable guide 22 may slide and move by a predetermined distance along the sliding groove 1110 disposed on an outer peripheral surface of the cable guide block 111 due to the influence of the rotation of the cable. Then, the second portion 302 may be protected by the movable cable guide 22.

The first portion 302 of the cable according to various embodiments may be connected to the first rotary arm 12 and be located at an upper end portion of the base 11, and may be a portion, to which the strongest forward frictional force is applied due to movement of the cable because the movement speed of the first portion 302 is the same as the rotational speed of the first rotary arm along the first axis and, among the first to third portions 302, 304, and 306, the first portion 302 moves fastest.

Since the second portion 304 of the cable according to various embodiments connects the first and third portions 302 and 306 and rotates and moves forwards at the same time, a forward frictional force may be applied to the second portion 304 due to the rotational frictional force and the movement of cable. The movement speed of the second portion 304 may be about a half of the rotational speed of the first rotary arm along the first axis.

The third portion 306 of the cable according to various embodiments may be located at the lower end area 114 of the base 11 and may correspond to a state before the third portion 306 enters or exits the second portion 304, and an end of the third portion 306 may be connected to an external connector of the robot to communicate with a controller. The movement speed of the third portion 306 is zero, and thus may have no frictional force. Reference numeral 24 denotes a holding member, and may be a member that fixes an end of the third portion 306.

Figure 4A:
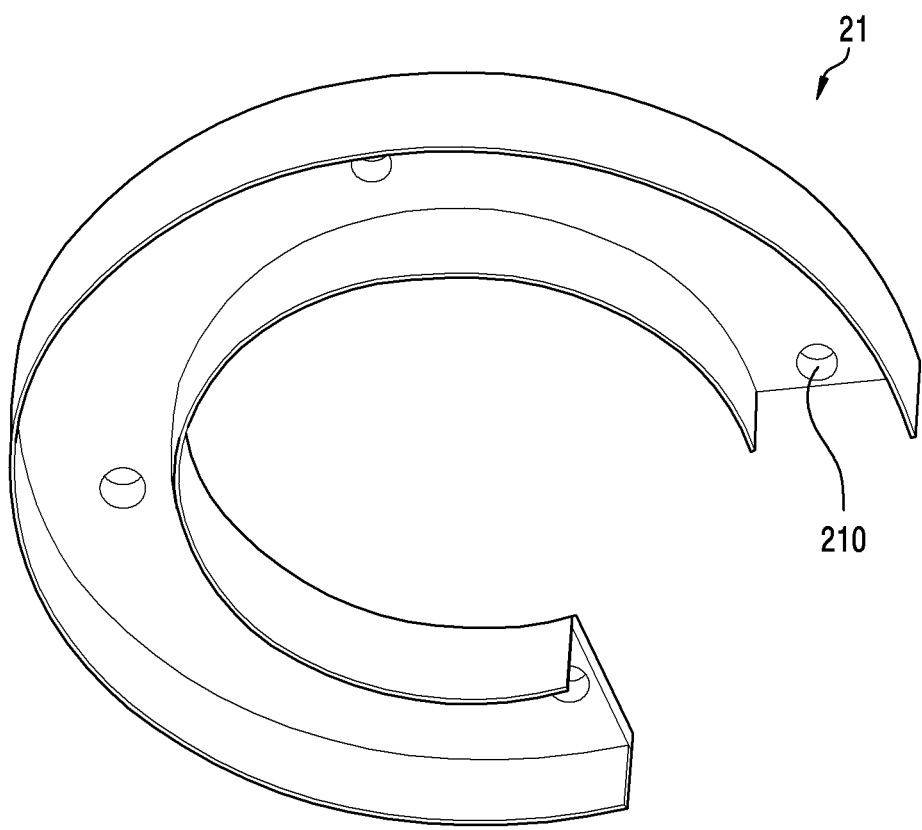
FIG. 4A is a perspective view illustrating a first cable protecting member according to various embodiments of the disclosure.

FIG. 4A is a perspective view illustrating a first cable protecting member according to various embodiments of the disclosure.

Referring to FIG. 4, the base (e.g., the base 11 of FIG. 1) according to various embodiments may further include a first cable protecting member 21 that accommodates the first portion 302 of the cable. For example, the first cable protecting member 21 is C-shaped, and is engaged with a rotary frame to rotate together with the rotary frame, and the first portion of the cable, which is accommodated in the first cable protecting member 21, also may rotate. For example, the first cable protecting member 21 may have a plurality of engaging holes 210 for engaging the first protecting member 21 with the rotary frame.

Figure 4B:
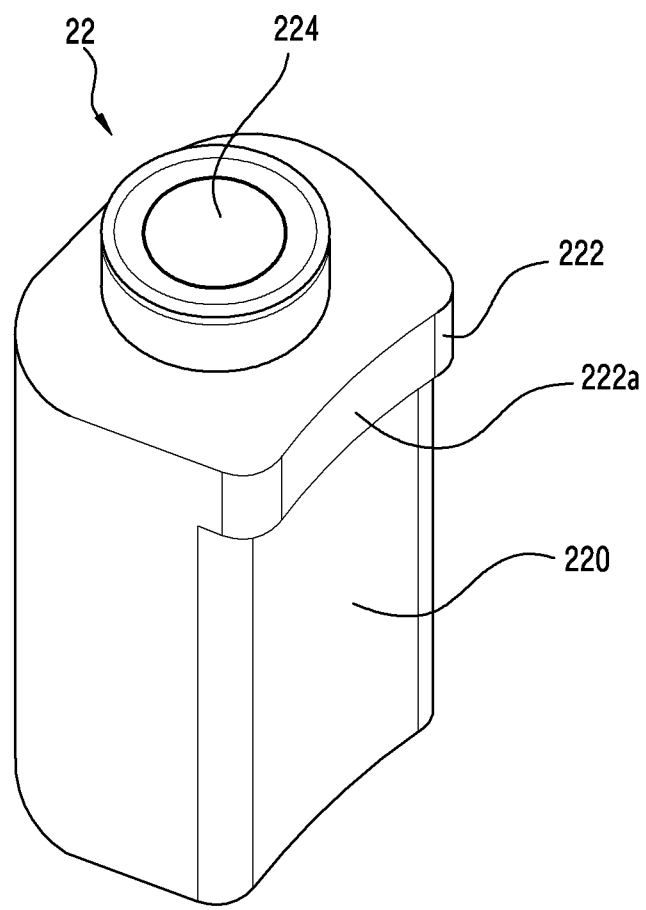
FIG. 4B is a perspective view illustrating a movable cable guide according to various embodiments of the disclosure.

FIG. 4B is a perspective view illustrating a movable cable guide according to various embodiments of the disclosure.

Referring to FIG. 4B, the movable cable guide 22 according to various embodiments may include one end disposed to have a gap with the inner wall of the base 11 and an opposite end that is inserted into the sliding groove of the cable guide block.

The movable cable guide 22 according to various embodiments may include a body 220 and a boss 222. Holes 224 may be disposed along a lengthwise direction of the body 220. The holes 224 may be holes, through which the cables pass. The second portion 304 of the cable may be disposed while passing through the hole 224. The boss 222 may be disposed at a portion of the body 220 and be inserted into the sliding groove. For example, the boss 222 may be disposed at an upper end or a middle portion of the body 220.

The boss 222 according to various embodiments may include a curved surface 222a having a curvature. The curved surface 222a may contact the sliding groove (e.g., the sliding groove 1110 of FIG. 2) and may slide in the sliding groove while surface-contacting the sliding groove.

The movable sliding guide 22 according to various embodiments is formed of an industrial synthetic resin (e.g., plastic), and may be formed of any one of MC nylon, acetyl, or Teflon. A ball bush may be attached to the movable cable guide 22 such that the balls of the ball bush contact the second portion 304 when the movable cable guide 22 rotates, whereby the rotational frictional resistance of the movable cable guide 22 may be minimized. The ball bush may be a commercial ball bush that is suitable for the diameter of the cable.

Figure 4C:
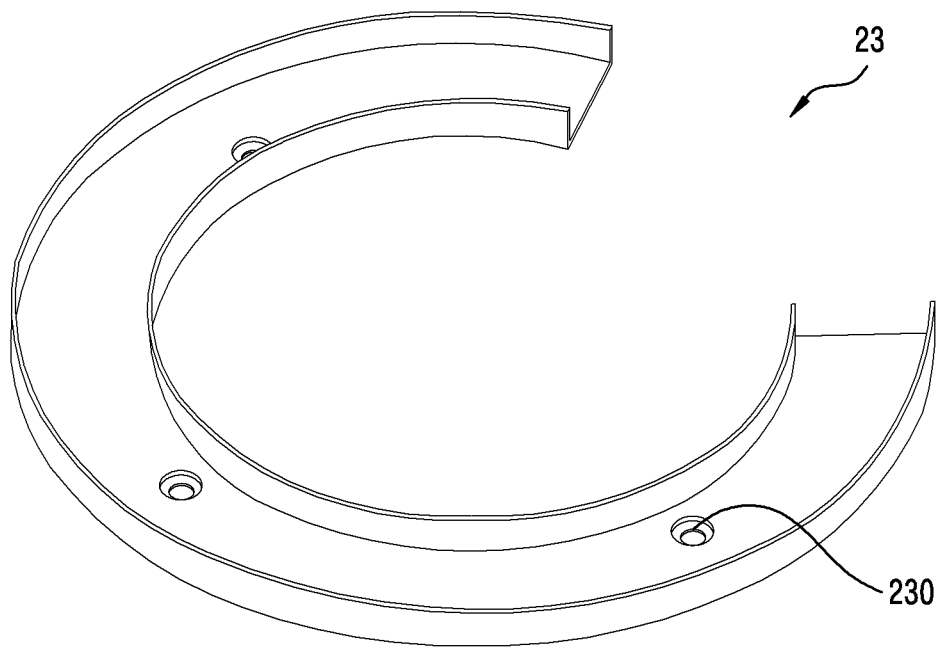
FIG. 4C is a perspective view illustrating a second cable protecting member according to various embodiments of the disclosure.

FIG. 4C is a perspective view illustrating a second cable protecting member according to various embodiments of the disclosure.

Referring to FIG. 4C, the base 11 according to various embodiments may include a second cable protecting member 23 disposed to face the first cable protecting member (e.g., the first cable protecting member 21 of FIG. 4A) to accommodate the third portion (e.g., the third portion 306 of FIG. 3A) of the cable. For example, the second cable protecting member 23 is C-shaped, and is engaged with the bottom of the base 11 and thus may be fixed to the bottom of the base 11. For example, the second cable protecting member 23 may have a plurality of engaging holes 230 for engaging the second protecting member 23 with the base.

Figure 4D:
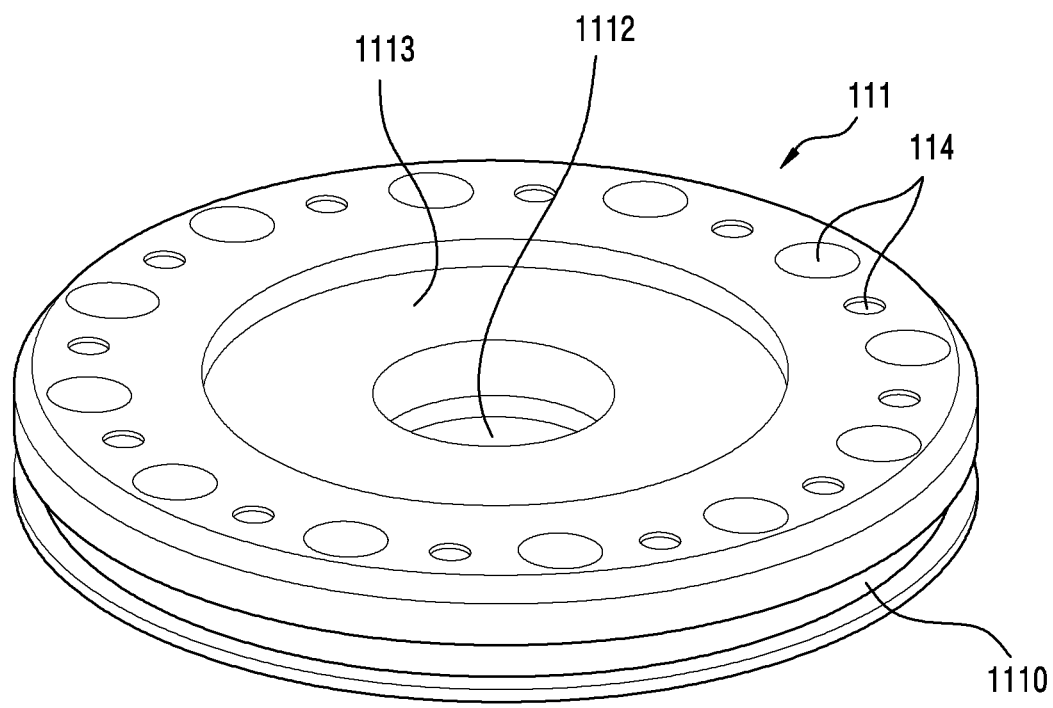
FIG. 4D is a perspective view illustrating a cable guide block according to various embodiments of the disclosure.

FIG. 4D is a perspective view illustrating a cable guide block according to various embodiments of the disclosure.

Referring to FIG. 4D, the cable guide block 111 according to various embodiments has a disk shape coupled to the driving motor (e.g., the driving motor M of FIG. 2), a coupling hole 1112 may be disposed at the center of the cable guide block 111, and a sliding groove 1110 may be disposed at an outer peripheral surface of the cable guide block 111. The sliding groove 110 may be a portion, into which the boss (e.g., the boss 222 of FIG. 4B) of the movable cable guide 22 is inserted to slide. A coupling recess 1113 may be disposed at a periphery of the coupling hole 1112 of the cable guide block 111 to be coupled to an upper end of the driving motor, and a plurality of engaging holes 1114, which are to be coupled to the case of the reduction gear 113, may be disposed.

An operation of the multi-articulator joint robot having the structure described with reference to FIGS. 1 to 4D will be described in the following.

If the first rotary arm (e.g., the first rotary arm 12 of FIG. 1) rotates, the pair of cables (e.g., the cable 30 of FIG. 3A) accommodated in the interior of the base 11 may repeatedly enter or exit different areas according to the rotational operation of the first rotary arm along the first axis. The movable cable guide 22 may be utilized as a mechanism for reducing a frictional force generated as the cable moves.

The second portion 304 of the cable is wired in a state in which the second portion 304 is put into the movable cable guide 22, which is not restricted, and the wired second portion 304 may freely move in a state in which the second portion 304 is protected by the cable guide 22 according to the movement of the cable. The frictional resistance generated while the second portion 304 moves may be applied to the movable cable guide 22 instead. The third portion 306 of the cable is disposed in a fixed state, but the second cable protecting member 23 may be disposed to prevent a frictional force that may be generated by the second portion 304.

Figure 5:
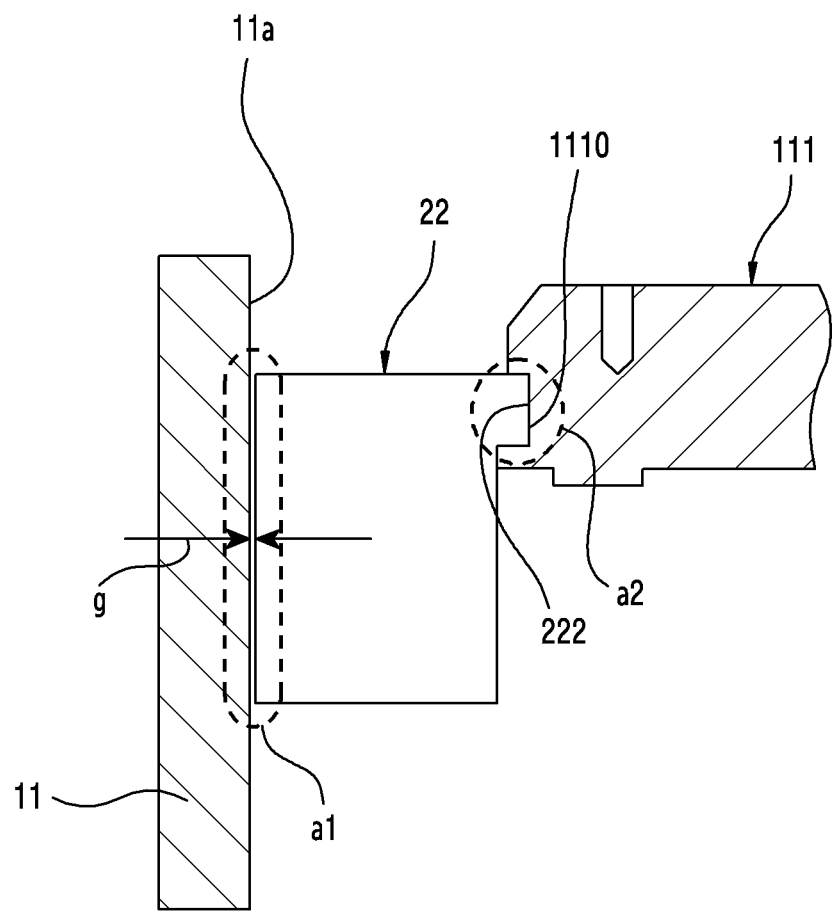
FIG. 5 is a cross-sectional view illustrating a mounting state of a movable cable guide according to various embodiments of the disclosure.

FIG. 5 is a cross-sectional view illustrating a mounting state of a movable cable guide according to various embodiments of the disclosure.

Referring to FIG. 5, at least a portion of the movable cable guide 22 according to various embodiments may be disposed to have a gap g with the inner wall 11a of the base 11, and the boss 222 may be inserted into the sliding groove 1110 while surface-contacting the sliding groove 1110 to slide.

A portion of the movable cable guide 22 may slide along the inner wall 11a during an operation of the multi-articulator joint robot, and the boss 222 may slide on the sliding groove 1110. A lubricant is introduced to an area a1 between the inner wall 11a of the base and a portion of the movable sliding guide 22 or an area a2 between the boss 222 and the sliding groove 1110 whereby the movable sliding guide 22 may smoothly slide and move. FIG. 5 is a cross-sectional view illustrating a mounting state of a movable cable guide according to various embodiments of the disclosure.

Figure 6:
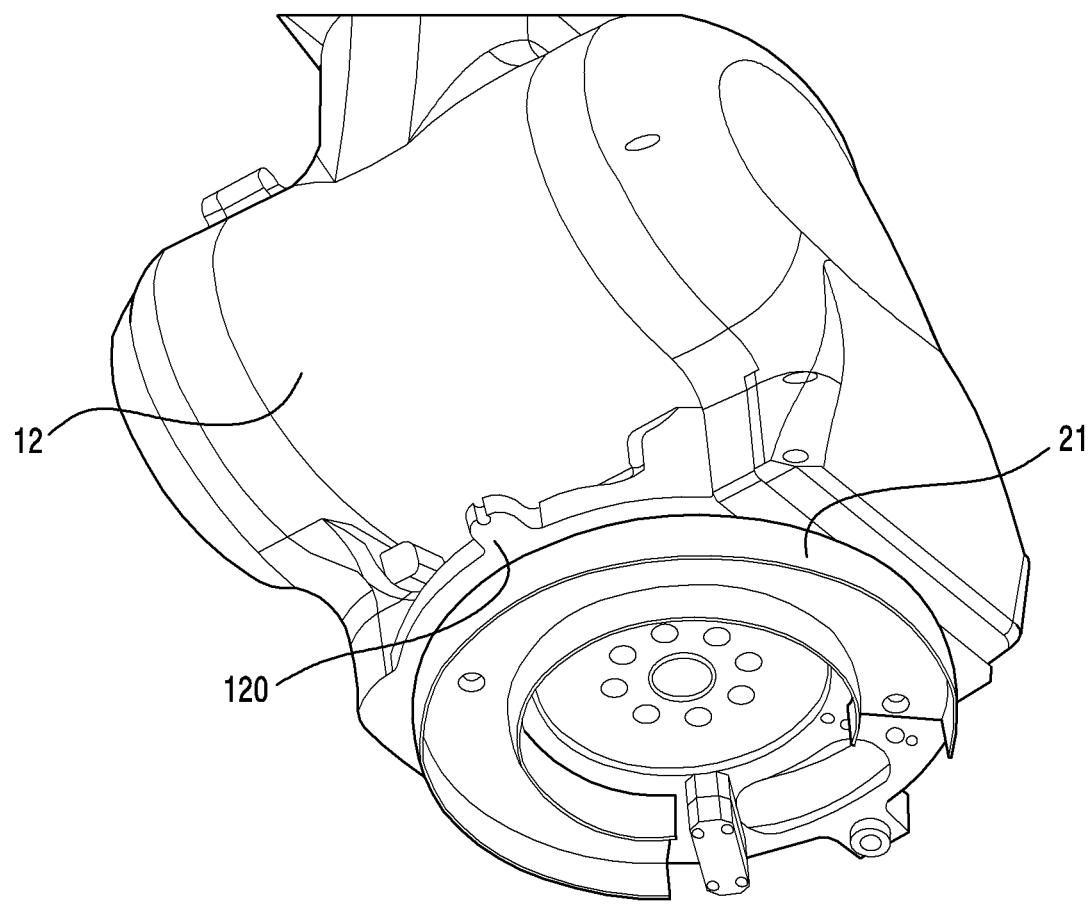
FIG. 6 is a perspective view illustrating a mounting state of a first cable protecting member according to various embodiments of the disclosure.

FIG. 6 is a perspective view illustrating a mounting state of a first cable protecting member according to various embodiments of the disclosure.

Referring to FIG. 6, the first cable protecting member 21 according to various embodiments may be coupled to the bottom surface of the rotary frame 120 coupled to the first rotary arm 12 by using a plurality of engaging members.

According to various embodiments of the disclosure, a cable guide device for a multi-articulator joint robot (e.g., the multi-articulator joint robot 10 illustrated in FIG. 1) may include a base (e.g., the base 11 of FIG. 1), one or more rotary arms (e.g., the rotary arms 12, 13, 14, and 15 of FIG. 1) rotatably coupled to the base in an articulated form, one or more cables (e.g., the cable 30 of FIG. 3A) connected to the rotary arm via the base, a cable guide block (e.g., the cable guide block 111 of FIG. 2) coupled to a driver in the base, a sliding groove (e.g., the sliding groove 1110 of FIG. 2) disposed on an outer peripheral surface of the cable guide block, and a cable friction reducing mechanism (e.g., the movable cable guide 22 of FIG. 3A) coupled to portions of the cables accommodated in the base, and configured to rotate in the sliding groove together with the portions of the cables as the rotary arms rotate.

According to various embodiments of the disclosure, the cable friction reducing mechanism may have holes, through which the portions of the cables pass.

According to various embodiments of the disclosure, the cable friction reducing mechanism may include one or more movable cable guides (e.g., the movable cable guide 22 of FIG. 3A).

According to various embodiments of the disclosure, the cable friction reducing mechanism is disposed between an inner wall (e.g., the inner wall 11a of the cable of FIG. 5) of the base and the cable guide block, and is moved along the sliding groove of the cable guide block by a tension of the cable.

According to various embodiments of the disclosure, each of the cables may include a first portion (e.g., the first portion 302 of FIG. 3A) disposed horizontally in the base, a second portion (e.g., the second portion 304 of FIG. 3A) extending from one end of the first portion and disposed vertically in the base, and a third portion (e.g., the third portion 306 of FIG. 3A) extending from an end of the cable, which is opposite to the first portion, being opposite to the first portion, and disposed horizontally in the base.

According to various embodiments of the disclosure, one end of the movable cable guide (the movable cable guide 22 of FIG. 3B) may be disposed to have a gap with an inner wall (e.g., the inner wall 11a of the cable of FIG. 5) of the base and an opposite end of the movable cable guide may be inserted into the sliding groove (e.g., the sliding groove 1110 of FIG. 2) to move along the sliding groove as the rotary arms rotate.

According to various embodiments of the disclosure, the movable cable guide (e.g., the movable cable guide 22 of FIG. 3B) may include a body (e.g., the body 220 of FIG. 4B) disposed such that the holes, through which the cables pass, are formed along a lengthwise direction thereof, and a boss (e.g., the boss 222 of FIG. 4B) disposed at a portion of the body, and inserted into the sliding groove.

According to various embodiments of the disclosure, the boss (e.g., the boss 222 of FIG. 4B) may include a curved surface (e.g., the curved surface 222a of FIG. 4B) having a curvature, and may be slid in the sliding groove.

According to various embodiments of the disclosure, the base may further include a first cable protecting member (e.g., the first cable protecting member 21 of FIG. 4A) accommodating the second portion, and the first cable protecting member (e.g., the first cable protecting member 210 of FIG. 4A) may be C-shaped and may be engaged with a rotary frame.

According to various embodiments of the disclosure, the base may further include a second cable protecting member (e.g., the second cable protecting member 23 of FIG. 4C) disposed to face the first cable protecting member to accommodate the third portion, and the second cable protecting member (e.g., the second cable protecting member 23 of FIG. 4C) may be C-shaped and may be engaged with a bottom of the base.

According to various embodiments of the disclosure, the sliding groove (e.g., the sliding groove 1110 of FIG. 2) may extend along an outer peripheral surface of the cable guide block.

According to various embodiments of the disclosure, the cable may be protected by a cable protecting pipe.

According to various embodiments of the disclosure, the cable (e.g., the cable 30 of FIG. 3A) may be curved at the second and third portions and may be linear at the first portion, and a bent shape may be disposed between the first and second portions and a bent shape may be disposed between the first and third portions.

According to various embodiments of the disclosure, the cable friction reducing mechanism may be formed of a synthetic resin, which is any one of MC nylon, acetyl, or Teflon.

According to various embodiments of the disclosure, a reduction gear (e.g., the reduction gear 113 of FIG. 2) coupled to an upper end of the cable guide block (e.g., the cable guide block 111 of FIG. 2) and the base may be coupled to a lower end of the cable guide block whereby the cable guide block functions as an adapter.

The embodiments of the disclosure, which are described and illustrated in the specification and the drawings, are merely specific examples for understanding of the technical contents of the disclosure, and are not intended to limit the scope of the disclosure. Therefore, it should be construed that all changes or modifications deduced based on the technical spirit of the disclosure, in addition to the embodiments disclosed herein, fall within the scope of the disclosure.

The invention claimed is:

1. A cable guide device for a multi-articulator joint robot comprising:
   a base;
   at least one rotary arm rotatably coupled to the base in an articulated form;
   one or more cables connected to the rotary arm via the base;
   a cable guide block coupled to a driver in the base;
   a sliding groove disposed on an outer peripheral surface of the cable guide block, wherein the sliding groove is opened in a radial direction; and
   a cable friction reducing mechanism coupled to portions of the one or more cables accommodated in the base, and configured to rotate in the sliding groove together with the portions of the one or more cables as the rotary arms rotate.

2. The cable guide device of claim 1, wherein the cable friction reducing mechanism have holes, through which the portions of the one or more cables pass.

3. The cable guide device of claim 2, wherein the cable friction reducing mechanism comprises one or more movable cable guides.

4. The cable guide device of claim 3, wherein one end of one of the one or more movable cable guides is disposed to have a gap with an inner wall of the base and an opposite end of one of the one or more movable cable guides is inserted into the sliding groove to move along the sliding groove as the rotary arm rotates.

5. The cable guide device of claim 3, wherein one of the one or more movable cable guides comprises:
   a body disposed such that the holes, through which the one or more cables pass, are formed along a lengthwise direction thereof; and
   a boss disposed at a portion of the body, and inserted into the sliding groove.

6. The cable guide device of claim 5, wherein the boss comprises a curved surface having a curvature, and is slid in the sliding groove.

7. The cable guide device of claim 2, wherein the cable friction reducing mechanism is disposed between an inner wall of the base and the cable guide block, and is moved along the sliding groove of the cable guide block by a tension of one of the one or more cables.

8. The cable guide device of claim 1, wherein each of the one or more cables comprises:
   a first portion disposed horizontally in the base;
   a second portion extending from one end of the first portion and disposed vertically in the base; and
   a third portion extending from an end of one of the one or more cables, which is opposite to the first portion, being opposite to the first portion, and disposed horizontally in the base.

9. The cable guide device of claim 8, wherein the base further comprises a first cable protecting member accommodating the first portion, and
   wherein the first cable protecting member is C-shaped and is engaged with a rotary frame of the rotary arm.

10. The cable guide device of claim 8, wherein the base further comprises a second cable protecting member disposed to face a first cable protecting member to accommodate the third portion, and
    wherein the second cable protecting member is C-shaped and is engaged with a bottom of the base.

11. The cable guide device of claim 8, wherein one of the one or more cables is curved at the second and third portions and is linear at the first portion, and
    wherein a bent shape is disposed between the first and second portions and a bent shape is disposed between the first and third portions.

12. The cable guide device of claim 1, wherein the sliding groove extends along an outer peripheral surface of the cable guide block.

13. The cable guide device of claim 1, wherein the one or more cables are covered by a cable protecting pipe.

14. The cable guide device of claim 1, wherein the cable friction reducing mechanism is formed of a synthetic resin, which is any one of MC nylon, acetyl, or Teflon.

15. The cable guide device of claim 1, wherein a reduction gear is coupled to an upper end of the cable guide block and the base is coupled to a lower end of the cable guide block whereby the cable guide block functions as an adapter.

* * * * *